United States Patent

Lee

(10) Patent No.: US 9,531,426 B2
(45) Date of Patent: Dec. 27, 2016

(54) ELECTRONIC DEVICE AND ANTENNA MODULE CAPABLE OF ADJUSTING ANTENNA CHARACTERISTICS DYNAMICALLY

(71) Applicant: Qisda Corporation, Taoyuan (TW)

(72) Inventor: Wei-Huan Lee, New Taipei (TW)

(73) Assignee: Qisda Corporation, Taoyuan County (TW)

(*) Notice: Subject to any disclaimer, the term of this patent is extended or adjusted under 35 U.S.C. 154(b) by 0 days.

(21) Appl. No.: 14/952,921

(22) Filed: Nov. 26, 2015

(65) Prior Publication Data

US 2016/0164566 A1    Jun. 9, 2016

(30) Foreign Application Priority Data

Dec. 3, 2014    (TW) .............................. 103142050 A

(51) Int. Cl.
*H04B 1/40*    (2015.01)
(52) U.S. Cl.
CPC ...................... *H04B 1/40* (2013.01)
(58) Field of Classification Search
None
See application file for complete search history.

(56) References Cited

U.S. PATENT DOCUMENTS

| 2015/0091016 A1* | 4/2015 | Chen .................... G09G 3/3225 257/72 |
| 2015/0318620 A1* | 11/2015 | Black ...................... H01Q 1/38 343/731 |

FOREIGN PATENT DOCUMENTS

TW    I310689    6/2009

* cited by examiner

*Primary Examiner* — Mohammed Rachedine

(57) ABSTRACT

An electronic device capable of adjusting antenna characteristics dynamically includes a flexible antenna, a sensing unit, an antenna tuner, a storage unit and a processing unit. The sensing unit is configured to sense a curvature information of the flexible antenna. The storage unit is configured to store a look-up table, wherein the look-up table records a plurality of curvature ranges and a plurality of predetermined setting parameters, and each of the predetermined setting parameters is corresponding to one of the curvature ranges. The processing unit is configured to calculate a curvature level of the flexible antenna, compare the curvature level with the curvature ranges to select a setting parameter corresponding to the curvature level from the predetermined setting parameters, and set the antenna tuner according to the selected setting parameter.

8 Claims, 4 Drawing Sheets

ELECTRONIC DEVICE AND ANTENNA MODULE CAPABLE OF ADJUSTING ANTENNA CHARACTERISTICS DYNAMICALLY

BACKGROUND OF THE INVENTION

1. Field of the Invention

The present invention relates to an electronic device and an antenna module capable of adjusting antenna characteristics of a flexible antenna dynamically, and more particularly, to an electronic device and an antenna module capable of adjusting antenna characteristics of the flexible antenna dynamically based on a curvature level of the flexible antenna.

2. Description of the Prior Art

An antenna is an electronic component used for emitting and/or receiving wireless signals. It plays an important role in a wireless communication system. There are antennas everywhere in our daily life, such as in mobile phones, base stations, Bluetooth devices, broadcasting devices, televisions, and point-to-point wireless communication devices, etc. The quality of wireless communication is determined mainly based on antenna characteristics, such as antenna efficiency, gain, total radiation power (TRP) and total isotropic sensitivity (TIS), etc. In addition to the antenna design itself, the curvature of the antenna during usage also has great influence on the antenna characteristics. Thus, it is an important topic to maintain good performance of the antenna characteristics.

SUMMARY OF THE INVENTION

One of the purposes of the present invention is to provide an electronic device and an antenna module capable of adjusting antenna characteristics of a flexible antenna dynamically based on a curvature level of the flexible antenna, so as to resolve the aforementioned problems.

According to one embodiment of the present invention, the electronic device capable of adjusting antenna characteristics dynamically includes a flexible antenna, a sensing unit, an antenna tuner, a storage unit and a processing unit. The antenna tuner is electrically connected to the flexible antenna. The processing unit is electrically connected to the sensing unit, the antenna tuner and the storage unit. The sensing unit is configured to sense a curvature information of the flexible antenna. The storage unit is configured to store a look-up table. The look-up table records a plurality of curvature ranges and a plurality of predetermined setting parameters. Each of the predetermined setting parameters corresponds to one of the curvature ranges. The processing unit is configured to calculate a curvature level of the flexible antenna based on the curvature information, compare the curvature level with the curvature ranges to select a setting parameter corresponding to the curvature level from the predetermined setting parameters, and set the antenna tuner according to the selected setting parameter.

According to another embodiment of the present invention, the antenna module capable of adjusting antenna characteristics dynamically includes a flexible antenna, a sensing unit, an antenna tuner, a storage unit and a processing unit. The antenna tuner is electrically connected to the flexible antenna. The processing unit is electrically connected to the sensing unit, the antenna tuner and the storage unit. The sensing unit is configured to sense a curvature information of the flexible antenna. The storage unit is configured to store a look-up table. The look-up table records a plurality of curvature ranges and a plurality of predetermined setting parameters. Each of the predetermined setting parameters corresponds to one of the curvature ranges. The processing unit is configured to calculate a curvature level of the flexible antenna based on the curvature information, compare the curvature level with the curvature ranges to select a setting parameter corresponding to the curvature level from the predetermined setting parameters, and set the antenna tuner according to the selected setting parameter.

In sum, when the flexible antenna bends, the processing unit calculates the curvature level of the flexible antenna based on the curvature information sensed by the sensing unit, and sets the antenna tuner according to the setting parameter corresponding to the curvature level based on the look-up table stored in the storage unit. Thus one can obtain better antenna characteristics of the flexible antenna under the curvature level. As long as the flexible antenna bends, according to the present invention, the antenna characteristics of the flexible antenna is dynamically adjusted based on the current curvature level of the flexible antenna so as to maintain good performance.

The above and other objectives of the present invention will no doubt become obvious to those of ordinary skill in the art after reading the following detailed description of the preferred embodiment that is illustrated in the various figures and drawings.

DETAILED DESCRIPTION OF PREFERRED EMBODIMENTS

Figure 1:
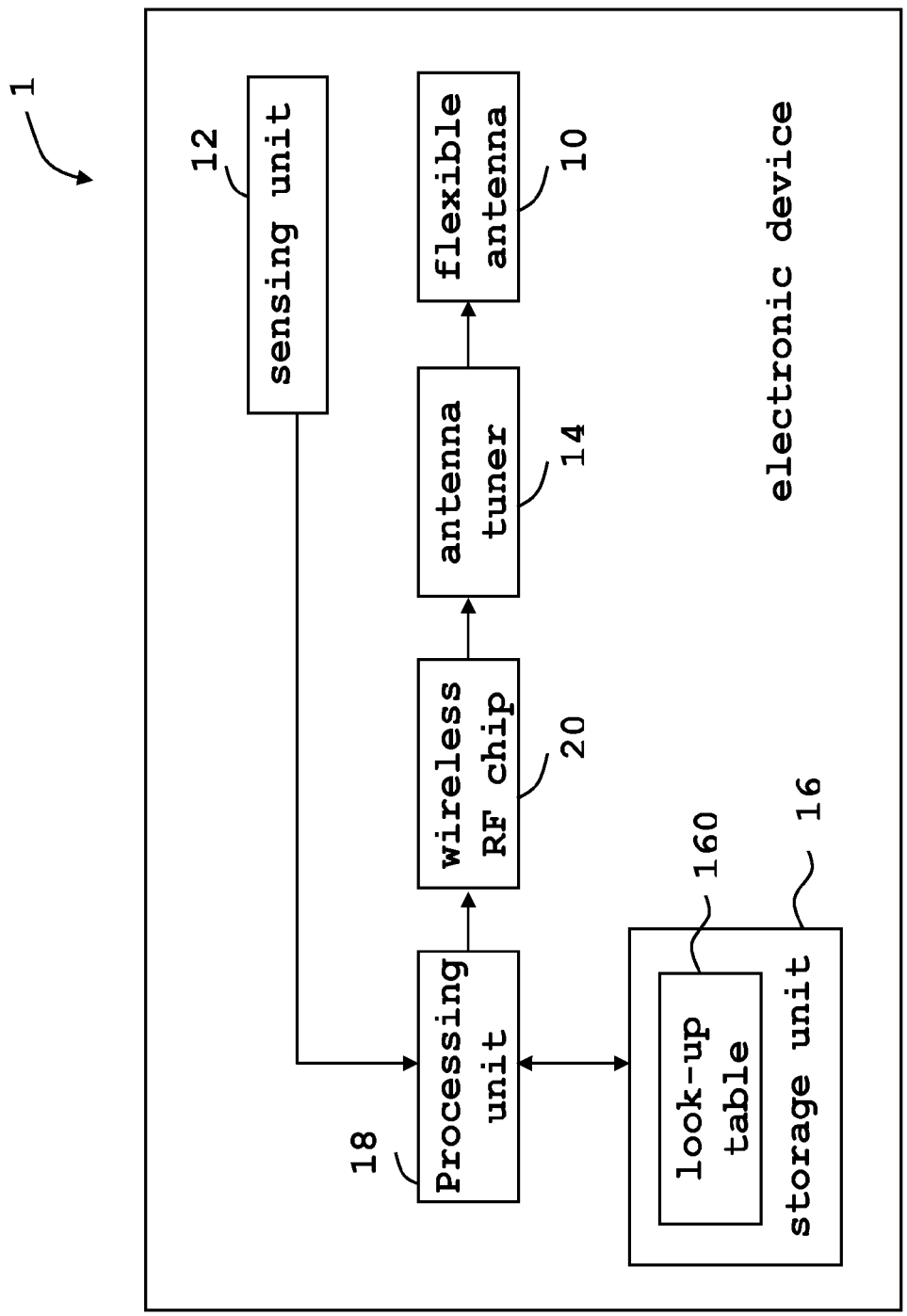
FIG. 1 is an illustrative functional block diagram of an electronic device capable of adjusting antenna characteristics according to an embodiment of the present invention.
Figure 2:
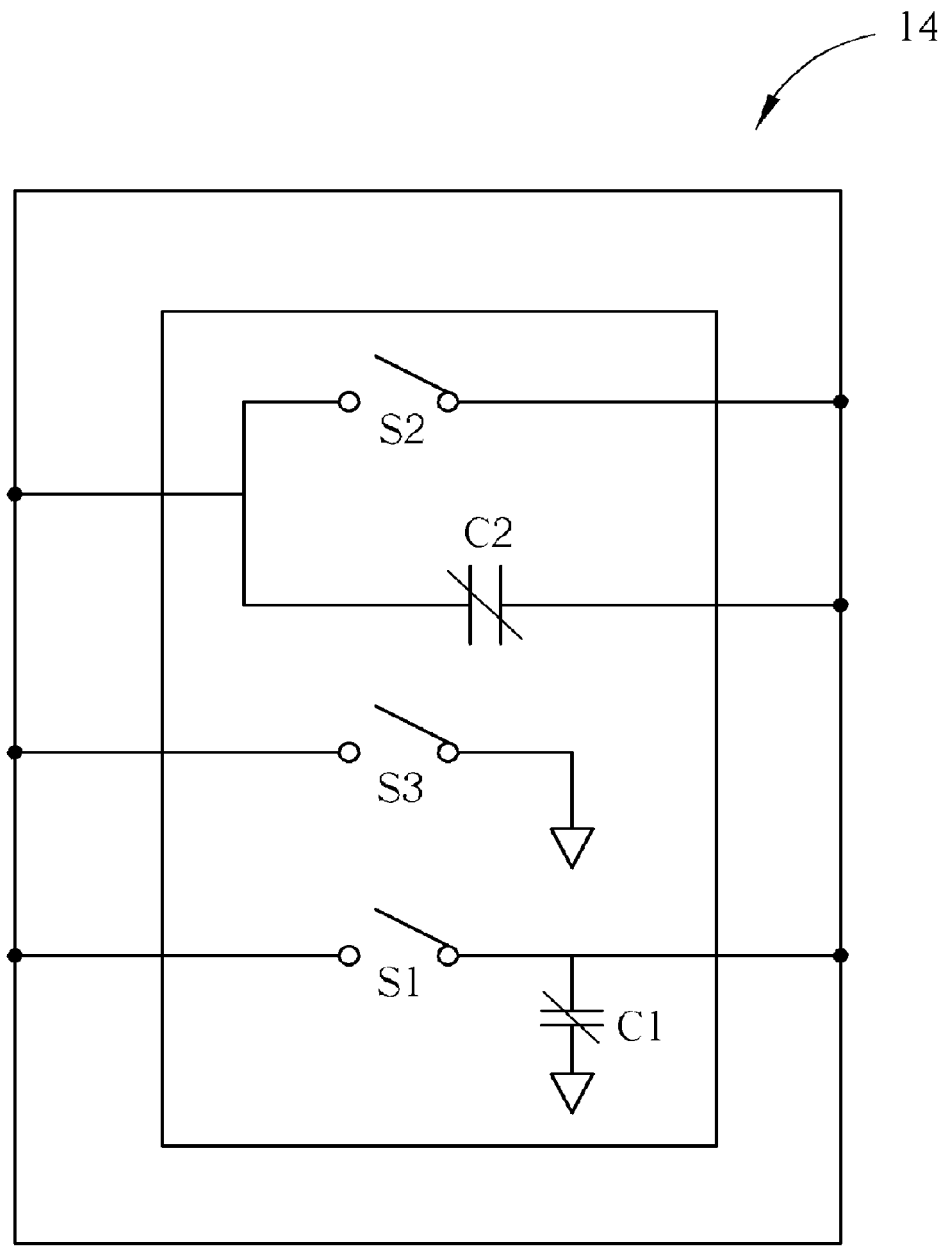
FIG. 2 is an illustrative circuit diagram of the antenna tuner of FIG. 1.
Figure 3:
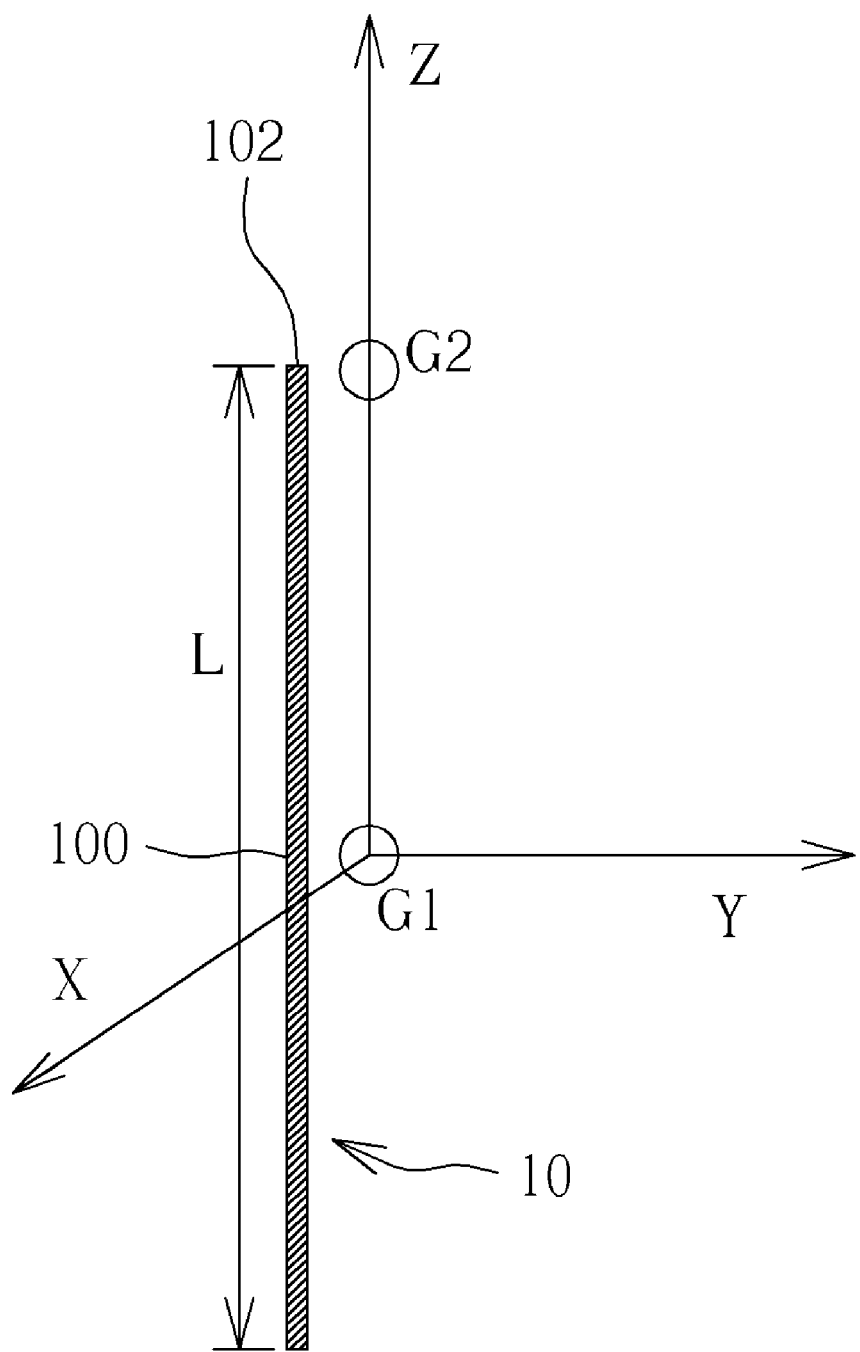
FIG. 3 is an illustrative diagram of the flexible antenna of FIG. 1 before bending in a three-dimensional (3D) coordinate system.
Figure 4:
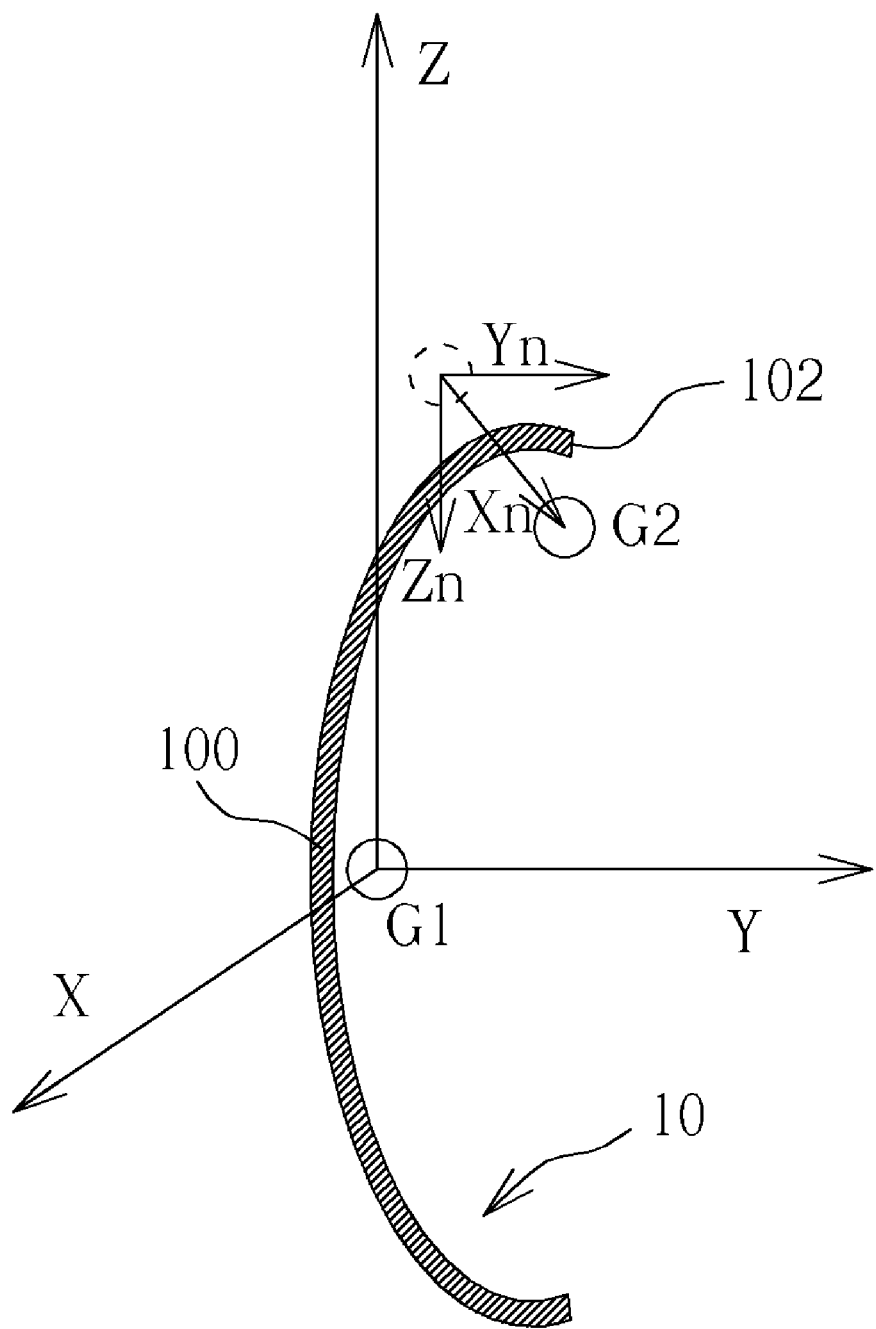
FIG. 4 is an illustrative diagram of the flexible antenna of FIG. 1 after bending in the 3D coordinate system.

Please refer to FIG. 1 through FIG. 4. FIG. 1 is an illustrative functional block diagram of an electronic device 1 capable of adjusting antenna characteristics according to an embodiment of the present invention. FIG. 2 is an illustrative circuit diagram of the antenna tuner 14 of FIG. 1. FIG. 3 is an illustrative diagram of the flexible antenna 10 of FIG. 1 before bending in a three-dimensional (3D) coordinate system. FIG. 4 is an illustrative diagram of the flexible antenna 10 of FIG. 1 after bending in the 3D coordinate system.

As shown in FIG. 1, the electronic device 1 capable of adjusting antenna characteristics dynamically includes a flexible antenna 10, a sensing unit 12, an antenna tuner 14, a storage unit 16, a processing unit 18 and a wireless radiofrequency (RF) chip 20. The antenna tuner 14 is electrically connected to the flexible antenna 10 and the wireless RF chip 20. The processing unit 18 is electrically connected to the sensing unit 12, the wireless RF chip 20 and the storage unit 16. In the embodiment, the processing unit 18 is electrically connected to the antenna tuner 14 through the wireless RF chip 20. In practical application, the electronic device 1 may be any electronic device with communication function, such as a mobile phone, a base station, a blue tooth device, a broadcasting device, a television (TV)

or a point-to-point wireless communication device, etc. The flexible antenna 10 may be a monopole antenna, a dipole antenna, a Patched Inverse F Antenna (PIFA) or other antennas. The storage unit 16 may be a memory device, a memory card, a hard disc or other data storage device. The processing unit 18 may be a processor or a controller with data processing function.

In the embodiment, the storage unit 16 is configured to store a look-up table 160. The look-up table 160 records a plurality of curvature ranges and a plurality of predetermined setting parameters. Each of the predetermined setting parameters corresponds to one of the curvature ranges. Moreover, the look-up table 160 further records a plurality of predetermined wireless communication systems, a plurality of bandwidth ranges each of which corresponds to one of the predetermined wireless communication systems and the plurality of curvature ranges each of which corresponds to one of the bandwidth ranges. Please refer to Table 1. Table 1 shows an embodiment of the look-up table 160.

TABLE 1 look-up table 160

| predetermined wireless communication system | bandwidth range | curvature range | predetermined setting parameter |
|---|---|---|---|
| Long Term Evolution (LTE) | $B_0$-$B_1$ | $R_0$-$R_1$ | $P_{11}$ |
| | | $R_1$-$R_2$ | $P_{12}$ |
| | | ... | ... |
| | | $R_{x-1}$-$R_x$ | $P_{1x}$ |
| | $B_1$-$B_2$ | $R_0$-$R_1$ | $P_{21}$ |
| | | $R_1$-$R_2$ | $P_{22}$ |
| | | ... | ... |
| | | $R_{x-1}$-$R_x$ | $P_{2x}$ |
| | ... | ... | ... |
| | $B_{n-1}$-$B_n$ | $R_0$-$R_1$ | $P_{n1}$ |
| | | $R_1$-$R_2$ | $P_{n2}$ |
| | | ... | ... |
| | | $R_{x-1}$-$R_x$ | $P_{nx}$ |
| Universal Mobile Telecommunications System (UMTS) | $B_0$-$B_1$ | $R_0$-$R_1$ | $P_{11}$ |
| | | $R_1$-$R_2$ | $P_{12}$ |
| | | ... | ... |
| | | $R_{y-1}$-$R_y$ | $P_{1y}$ |
| | $B_1$-$B_2$ | $R_0$-$R_1$ | $P_{21}$ |
| | | $R_1$-$R_2$ | $P_{22}$ |
| | | ... | ... |
| | | $R_{y-1}$-$R_y$ | $P_{2y}$ |
| | ... | ... | ... |
| | $B_{m-1}$-$B_m$ | $R_0$-$R_1$ | $P_{m1}$ |
| | | $R_1$-$R_2$ | $P_{m2}$ |
| | | ... | ... |
| | | $R_{y-1}$-$R_y$ | $P_{my}$ |
| ... | ... | ... | ... |

In the embodiment of the present invention, Table 1 is generated as follows. First, within a specific bandwidth range in a given wireless communication system, the flexible antenna 10 is fixed within a certain curvature range. The setting parameter of the antenna tuner 14 is adjusted so as to obtain better antenna characteristics. The setting parameter after adjustment is then recorded in the look-up table 160. The aforementioned steps are repeated for each bandwidth range in every wireless communication system to complete the look-up table 160. During manufacturing of the electronic device 1 according to the embodiment of the present invention, the look-up table 160 is stored in the storage unit 16 as the basis for adjusting antenna characteristics of the flexible antenna 10 in practical application.

The flexible antenna 10 receives a wireless signal and the sensing unit 12 senses a curvature information of the flexible antenna 10. When the flexible antenna 10 receives the wireless signal, the processing unit 18 determines a wireless communication system and a bandwidth of the wireless signal. When the flexible antenna 10 bends, the processing unit 18 calculates a curvature level of the flexible antenna 10 based on the curvature information. The processing unit 18 then compares the wireless communication system of the received wireless signal with the predetermined wireless communication systems stored in the look-up table 160, compares the bandwidth of the received wireless signal with the bandwidth ranges stored in the look-up table 160, and compares the curvature level of the flexible antenna 10 with the curvature ranges stored in the look-up table 160 so as to select a proper setting parameter corresponding to the wireless communication system and the bandwidth of the received wireless signal, as well as the curvature level of the flexible antenna 10 from the predetermined setting parameters stored in the look-up table 160. The processing unit 18 then sets the antenna tuner 14 according to the selected setting parameter through the wireless RF chip 20. Thereafter, the user can obtain better antenna characteristics of the flexible antenna 10 under the specific curvature level. In practical application, the data and/or control command generated by the processing unit 18 may not need to be processed or amplified by the wireless RF chip 20, and may be sent directly to the antenna tuner 14 instead. Thus, as long as the flexible antenna 10 bends, according to the present invention, the antenna characteristics of the flexible antenna 10 is adjusted based on the curvature level of the flexible antenna 10 so as to maintain good performance.

As shown in FIG. 2, in the embodiment of the present invention, the circuit of the antenna tuner 12 includes switches S1, S2, S3 and capacitors C1 and C2. The aforementioned setting parameters may be the capacitance settings of capacitors C1 and C2. In the embodiment, the processing unit 18 adjusts the capacitance of capacitors C1 and C2 by controlling the switching of switches S1, S2, S3 to adjust the antenna characteristics of the flexible antenna 10.

In the embodiment, the sensing unit 12 includes a first gravity sensor G1 and a second gravity sensor G2, as shown in FIGS. 3 and 4. The first gravity sensor G1 is disposed adjacent to a middle part 100 of the flexible antenna 10, and the second gravity sensor G2 is disposed adjacent to an end part 102 of the flexible antenna 10. The first gravity sensor G1 is configured to sense a first movement information of the middle part 100, and the second gravity sensor G2 is configured to sense a second movement information of the end part 102. The aforementioned curvature information includes the first movement information and the second movement information.

In the embodiment, the processing unit 18 calculates the curvature level of the flexible antenna 10 based on the first movement information, the second movement information and a length L of the flexible antenna 10. Alternatively, the processing unit 18 may use the first movement information and the second movement information as the curvature level of the flexible antenna 10. The curvature level of the flexible antenna 10 is calculated in as follows.

As shown in FIGS. 3 and 4, when the flexible antenna 10 bends, the first gravity sensor G1 and the second gravity sensor G2 move accordingly. First of all, within a unit time tn, the processing unit 18 calculates the first gravity sensor G1's movements xg1(tn), yg1(tn) and zg1(tn) along the X-axis, the Y-axis and the Z-axis, respectively, and calculates the second gravity sensor G2's movements xg2(tn), yg2(tn) and zg2(tn) along the X-axis, the Y-axis and the Z-axis, respectively. Within the unit time tn, the processing unit 18 then calculates the relative movements Xtn, Ytn and Ztn along the X-axis, the Y-axis and the Z-axis, respectively, between the first gravity sensor G1 and the second gravity sensor G2; wherein Xtn=xg1(tn)−xg2(tn), Ytn=yg1(tn)−yg2(tn) and Ztn=zg1(tn)−zg2(tn). The processing unit 18 then calculates the present relative movements Xn, Yn and Zn along the X-axis, the Y-axis and the Z-axis, respectively, between the first gravity sensor G1 and the second gravity sensor G2; wherein Xn=Xn−1+Xtn, Yn=Yn−1+Ytn, Zn=Zn−1+Ztn, X0=0, Y0=0 and Z0=0.

As described above, in the embodiment of the present invention, the present relative movements Xn, Yn and Zn along the X-axis, the Y-axis and the Z-axis, respectively, between the first gravity sensor G1 and the second gravity sensor G2 can be directly used to represent the curvature level of the flexible antenna 10. Under such scenario, the curvature ranges recorded in the look-up table 160 are therefore the movement ranges between the first gravity sensor G1 and the second gravity sensor G2.

Further, in another embodiment of the present invention, the processing unit 18 may also calculate the curvature angle of the flexible antenna 10 based on the present relative movements Xn, Yn and Zn along the X-axis, the Y-axis and the Z-axis, respectively, between the first gravity sensor G1 and the second gravity sensor G2, as well as the length L of the flexible antenna 10 to represent the curvature level of the flexible antenna 10. In the embodiment, the flexible antenna 10 may be designed so that the flexible antenna 10 is only able to be bent at both ends, and the curvature shape of the top half of the flexible antenna 10 and that of the bottom half of the flexible antenna 10 are identical. For example, the flexible antenna 10 is only able to be bent towards the Y-axis and the Z-axis but not towards the X-axis, and both the top half and the bottom half of the flexible antenna 10 are bent towards the Y-axis and symmetrical with respect to the Z-axis. At this time, the curvature level of the flexible antenna 10 can be defined as $2*Yn/(L-2*Zn)$. When the curvature level is 0, it means the flexible antenna 10 is not bent. When the curvature level is 1, it means the flexible antenna 10 is bent to the middle extent. When the curvature level is large, it means the flexible antenna 10 is extremely bent. In the present invention, the curvature level of the flexible antenna 10 can be defined by different ranges.

In another embodiment of the present invention, the sensing unit 12 may be a variable resistor disposed adjacent to the flexible antenna 10. When the flexible antenna 10 is bent, the variable resistor is bent accordingly. The curvature level of the flexible antenna 10 is calculated based on the resistance of the variable resistor.

Please note that the flexible antenna 10, the sensing unit 12, the antenna tuner 14, the storage unit 16, the processing unit 18 and the wireless RF chip 20 may be incorporated into the antenna module capable of adjusting antenna characteristics dynamically.

In sum, when the flexible antenna bends, the processing unit calculates the curvature level of the flexible antenna based on the curvature information sensed by the sensing unit, corresponds the curvature level to a proper setting parameter by looking up in a look-up table stored in the storage unit, and then sets the antenna tuner by the corresponding setting parameter. Thus one can obtain better antenna characteristics of the flexible antenna under the curvature level. As long as the flexible antenna bends, according to the present invention, the antenna characteristics of the flexible antenna is dynamically adjusted based on the current curvature level of the flexible antenna so as to maintain good performance.

What is claimed is:

1. An electronic device capable of adjusting antenna characteristics dynamically comprising:
   a flexible antenna;
   a sensing unit for sensing a curvature information of the flexible antenna, wherein the sensing unit comprises a first gravity sensor and a second gravity sensor, the first gravity sensor is disposed adjacent to a middle part of the flexible antenna, the second gravity sensor is disposed adjacent to an end part of the flexible antenna, the first gravity sensor is for sensing a first movement information of the middle part, the second gravity sensor is for sensing a second movement information of the end part, and the curvature information comprises the first movement information and the second movement information;
   an antenna tuner, electrically connected to the flexible antenna;
   a storage unit for storing a look-up table, wherein the look-up table records a plurality of curvature ranges and a plurality of predetermined setting parameters, and each of the predetermined setting parameters is corresponding to one of the curvature ranges; and
   a processing unit, electrically connected to the sensing unit, the antenna tuner and the storage unit, the processing unit is for calculating a curvature level of the flexible antenna based on the curvature information, compare the curvature level with the curvature ranges to select a setting parameter corresponding to the curvature level from the predetermined setting parameters, and set the antenna tuner according to the selected setting parameter.

2. The electronic device capable of adjusting antenna characteristics dynamically of claim 1, wherein the flexible antenna receives a wireless signal; the processing unit determines a wireless communication system and a bandwidth of the wireless signal; the look-up table further records a plurality of predetermined wireless communication systems, a plurality of bandwidth ranges each of which corresponds to one of the predetermined wireless communication systems and the plurality of curvature ranges each of which corresponds to one of the bandwidth ranges; the processing unit compares the wireless communication system with the predetermined wireless communication systems, compares the bandwidth with the bandwidth ranges, and compares the curvature level with the curvature ranges so as to select the setting parameter corresponding to the wireless communication system, the bandwidth and the curvature level from the predetermined setting parameters.

3. The electronic device capable of adjusting antenna characteristics dynamically of claim 1, wherein the processing unit calculates the curvature level based on the first movement information, the second movement information and a length of the flexible antenna.

4. The electronic device capable of adjusting antenna characteristics dynamically of claim 1, wherein the processing unit directly uses the first movement information and the second movement information as the curvature level.

5. An antenna module capable of adjusting antenna characteristics dynamically comprising:
   a flexible antenna;
   a sensing unit for sensing a curvature information of the flexible antenna, wherein the sensing unit comprises a first gravity sensor and a second gravity sensor, the first gravity sensor is disposed adjacent to a middle part of the flexible antenna, the second gravity sensor is disposed adjacent to an end part of the flexible antenna, the first gravity sensor is for sensing a first movement information of the middle part, the second gravity sensor is for sensing a second movement information of the end part, and the curvature information comprises the first movement information and the second movement information;

an antenna tuner, electrically connected to the flexible antenna;

a storage unit for storing a look-up table, wherein the look-up table records a plurality of curvature ranges and a plurality of predetermined setting parameters, and each of the predetermined setting parameters is corresponding to one of the curvature ranges; and a processing unit, electrically connected to the sensing unit, the antenna tuner and the storage unit, the processing unit is for calculating a curvature level of the flexible antenna based on the curvature information, compare the curvature level with the curvature ranges to select a setting parameter corresponding to the curvature level from the predetermined setting parameters, and set the antenna tuner according to the selected setting parameter.

6. The antenna module capable of adjusting antenna characteristics dynamically of claim 5, wherein the flexible antenna receives a wireless signal; the processing unit determines a wireless communication system and a bandwidth of the wireless signal; the look-up table further records a plurality of predetermined wireless communication systems, a plurality of bandwidth ranges each of which corresponds to one of the predetermined wireless communication systems and the plurality of curvature ranges each of which corresponds to one of the bandwidth ranges; the processing unit compares the wireless communication system with the predetermined wireless communication systems, compares the bandwidth with the bandwidth ranges, and compares the curvature level with the curvature ranges so as to select the setting parameter corresponding to the wireless communication system, the bandwidth and the curvature level from the predetermined setting parameters.

7. The antenna module capable of adjusting antenna characteristics dynamically of claim 5, wherein the processing unit calculates the curvature level based on the first movement information, the second movement information and a length of the flexible antenna.

8. The antenna module capable of adjusting antenna characteristics dynamically of claim 5, wherein the processing unit directly uses the first movement information and the second movement information as the curvature level.

* * * * *